(12) United States Patent
Ocegueda Gallaga et al.

(10) Patent No.: US 10,709,278 B2
(45) Date of Patent: *Jul. 14, 2020

(54) ILLUMINATION SYSTEM FOR AN ARTIFICIAL TREE

(71) Applicant: POLYGROUP MACAU LIMITED (BVI), Road Town, Tortola (VG)

(72) Inventors: Victor Hugo Ocegueda Gallaga, Baja California (MX); Yifeng Zhang, Xinxiang (CN); Elmer Chi Hang Cheng, Midlevel (HK)

(73) Assignee: POLYGROUP MACAU LIMITED (BVI), Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,978

(22) Filed: Jun. 24, 2019

(65) Prior Publication Data

US 2019/0307279 A1    Oct. 10, 2019

Related U.S. Application Data

(63) Continuation of application No. 15/606,517, filed on May 26, 2017, now Pat. No. 10,327,576.

(Continued)

(51) Int. Cl.
| | |
|---|---|
| *A47G 33/06* | (2006.01) |
| *H05B 45/10* | (2020.01) |
| *H05B 45/20* | (2020.01) |
| *H05B 47/11* | (2020.01) |
| *H05B 47/19* | (2020.01) |
| *A47G 33/08* | (2006.01) |
| *F21S 9/02* | (2006.01) |
| *F21V 23/06* | (2006.01) |

(Continued)

(52) U.S. Cl.
CPC ............. *A47G 33/06* (2013.01); *A47G 33/08* (2013.01); *F21S 9/02* (2013.01); *F21V 23/06* (2013.01); *H05B 45/10* (2020.01); *H05B 45/20* (2020.01); *H05B 47/11* (2020.01); *H05B 47/19* (2020.01); *A47G 2033/0827* (2013.01); *F21W 2121/04* (2013.01); *F21Y 2115/10* (2016.08)

(58) Field of Classification Search
CPC .................. A47G 33/06; A47G 33/08; A47G 2033/0827; F21S 9/02; F21V 23/06; F21V 23/0442; F21W 2121/04; F21Y 2115/10; H05B 33/0854; H05B 33/0863; H05B 37/0218; H05B 37/0272
See application file for complete search history.

(56) References Cited

U.S. PATENT DOCUMENTS

| | | | | |
|---|---|---|---|---|
| 2,047,045 A | * | 7/1936 | Veenboer | F21S 4/10 362/249.19 |
| 3,752,407 A | * | 8/1973 | Baugh | F21S 4/10 362/123 |

(Continued)

*Primary Examiner* — Peggy A Neils
(74) *Attorney, Agent, or Firm* — Troutman Sanders LLP; Ryan A. Schneider; Christopher C. Close, Jr.

(57) ABSTRACT

The disclosed technology includes an illumination system for a tree trunk of an artificial tree. The system may include a cylindrical shaped body, such that the outer surface of the body has a cylindrical shape. The inner surface of the body may include one or more diameters. One or more lighting modules may be positioned along the tree trunk to impart an internal lighting and/or glowing effect radiating therefrom.

20 Claims, 8 Drawing Sheets

Related U.S. Application Data

(60) Provisional application No. 62/342,374, filed on May 27, 2016.

(51) Int. Cl.
    *F21Y 115/10*    (2016.01)
    *F21W 121/04*    (2006.01)

(56) References Cited

U.S. PATENT DOCUMENTS

| | | | |
|---|---|---|---|
| 5,422,801 A * | 6/1995 | Sangalli, Jr. | F21S 4/10 |
| | | | 362/123 |
| 5,517,390 A | 5/1996 | Zins | |
| 5,702,170 A | 12/1997 | Broderick | |
| 7,249,863 B2 | 7/2007 | Ballarini et al. | |
| 10,327,576 B2 * | 6/2019 | Ocegueda Gallaga | |
| | | | H05B 37/0218 |
| 2001/0030862 A1 | 10/2001 | Simms | |
| 2005/0180163 A1 | 8/2005 | Huang | |
| 2016/0007430 A1 | 1/2016 | Kidakarn | |
| 2016/0330823 A1 | 11/2016 | Hwa et al. | |

* cited by examiner

ILLUMINATION SYSTEM FOR AN ARTIFICIAL TREE

CROSS-REFERENCE TO PRIORITY CLAIM

This application is a continuation application of U.S. patent application Ser. No. 15/606,517, filed 26 May 2017, entitled "ILLUMINATION SYSTEM FOR AN ARTIFICIAL TREE," now allowed, which claims the benefit under 35 U.S.C. § 119(e) of U.S. Provisional Patent Application No. 62/342,374, filed 27 May 2016, the entire contents and substance of which are incorporated herein by reference in their entirety.

FIELD

Embodiments of the present disclosure generally relate to illumination systems, and, more particularly, to illumination systems for use with artificial trees, such as artificial Christmas trees.

BACKGROUND

As part of the celebration of the Christmas season, many people traditionally bring a pine or evergreen tree into their home and decorate it with ornaments, lights, garland, tinsel, and the like. Natural trees, however, can be quite expensive and are recognized by some as a waste of environmental resources. In addition, natural trees can be messy, leaving both sap and needles behind after removal, and requiring water to prevent drying out and becoming a fire hazard. Each time a natural tree is obtained it must be decorated, and at the end of the Christmas season the decorations must be removed. Because the needles have likely dried and may be quite sharp by this time, removal of the decorations can be a painful process. In addition, natural trees are often disposed in landfills, further polluting these overflowing environments.

To overcome the disadvantages of a natural Christmas tree, yet still incorporate a tree into the holiday celebration, a great variety of artificial Christmas trees are available. For the most part, these artificial trees must be assembled for use and disassembled after use. Artificial trees have the advantage of being usable over a period of years and thereby eliminate the annual expense of purchasing live trees for the short holiday season. Further, they help reduce the chopping down of trees for a temporary decoration, and the subsequent disposal, typically in a landfill, of same.

Generally, artificial Christmas trees comprise a multiplicity of branches each formed of a plurality of plastic needles held together by twisting a pair of wires about them. In other instances, the branches are formed by twisting a pair of wires about an elongated sheet of plastic material having a large multiplicity of transverse slits. In still other artificial Christmas trees, the branches are formed by injection molding of plastic.

Irrespective of the form of the branch, the most common form of artificial Christmas tree comprises a plurality of trunk sections connectable to one another. For example, in many designs, a first and second trunk section each comprise an elongate body. A first end of the body includes a receiving portion (e.g., a female end) and a second end of the body includes an extending portion (e.g., a male end). Typically, the body is a cylinder. Near the second end the body tapers slightly to reduce the diameter of the body. In other words, the diameter of the first end, i.e., the receiving portion, is larger than the diameter of the second end, i.e., the extending portion. To connect the trunk sections, the first end of a first trunk sections receives the second end of a second trunk sections. For example, the tapered end of the first trunk section is inserted into the non-tapered end of the second trunk section. In this manner, a plurality of trunk sections can be connected and a tree assembled.

One difficulty encountered during or after assembly, however, is the illumination of lighting systems associated with the artificial Christmas tree. Embodiments of the present disclosure address this need as well as other needs that will become apparent upon reading the description below in conjunction with the drawings.

SUMMARY

Briefly described, embodiments of the present disclosure comprise a system to internally illuminate one or more trunk sections of an artificial tree. The system can advantageously enable a tree trunk to be selectively and/or internally illuminated. Embodiments of the present disclosure can therefore facilitate illumination of an artificial tree, improving user experience of the artificial tree.

In some embodiments, an artificial tree can include a plurality of trunk sections forming a tree trunk. One or more of the trunk sections can include an illumination system assembled therewith, attached thereon, or disposed within at least a portion of an inner void of at least one of the trunk sections. The illumination system can include a first lighting module for an internal lighting effect that radiates from the tree trunk. An example illumination system can include one or more additional lighting modules, wherein each module is evenly or unevenly distributed along the tree trunk.

An example lighting module can include a housing operable to attach to or assemble with the tree trunk, a light emitting device disposed in the housing, and/or an optical device disposed in or attached to the housing. The housing may include a battery electrically connected to the light emitting device and/or the optical device. One or more of the lighting modules may also be electrically connected to an external power supply. The housing may be removably fastened to a coupling of the tree trunk, the coupling being permanently positioned on the trunk or adjustable between a plurality of positions about the trunk. The optical device may be an optical sensor attached to an outer surface of the housing for sensing lighting conditions and evenly distributing light from the light emitting device from the housing. The optical device may also include a light diffuser. The light emitting device may be a light emitting diode, an incandescent bulb, or the like.

In other embodiments, the internal lighting effect can include one or multiple colors associated with each lighting module and/or the illumination system. An illumination system controller may also be included that is operatively connected to the illumination system and operable to manipulate the internal lighting effect of each lighting module and/or the illumination system. The controller can manipulate the internal lighting effect so that each lighting module radiates one of a plurality of single colors and/or one of a plurality of predetermined patterns, colors, shapes, designs, or the like. An optical sensor may also be provided and may be operatively connected to the tree trunk and the illumination system for sensing lighting conditions associated with each module and/or an ambient space about the tree trunk. The optical sensor may transmit sensed lighting data to the illumination system and the controller so that the controller automatically manipulates the internal lighting effect of the illumination system between one of a plurality of single colors and/or one of a plurality of predetermined patterns, colors, shapes, designs, or the like.

In some embodiments, the controller may be a manual inline controller. The controller may also be wirelessly connected to the illumination system as a smart phone, tablet, personal computer, or a separate RF controller. In this regard the controller can have a user interface to receive user input and manipulate the internal lighting effect so that each module radiates one of a plurality of single colors and/or one of a plurality of predetermined patterns, colors, shapes, designs, or the like.

In other embodiments, a system for illuminating an artificial tree is disclosed with a plurality of lighting modules. Each module can include a housing operable to attach to or assemble with a trunk of an artificial tree, a light emitting device disposed in the housing, the light emitting device having a lighting effect that radiates away from the lighting module. An optical device may also be included with each module and be disposed in or attached to the housing. The lighting effect of each lighting module may collectively form an internal lighting effect operable to radiate from the trunk of the artificial tree as discussed more particularly below.

An example housing can be electrically connected to an external power supply or include a battery electrically connected to the light emitting device and/or the optical device. The housing may also be removably attachable to a coupling of the trunk. In this respect, each module may be unevenly or evenly distributed along the trunk. An example optical device may include an optical sensor attached to an outer surface of the housing for sensing lighting conditions and evenly distributing light from the light emitting device from the housing. The optical device may include a light diffuser. The light emitting device of the lighting module may be a light emitting diode or an incandescent bulb.

In certain embodiments, the internal lighting effect of the system can include one or multiple colors associated with each lighting module. An illumination system controller may also be included in the system that is operatively connected to each module and operable to manipulate the lighting effect of each lighting module individually and/or collectively. The controller can manipulate the internal lighting effect so that each module radiates one of a plurality of single colors or one of a plurality of predetermined patterns, colors, shapes, designs, or the like.

In other embodiments, the system may also include a system optical sensor operatively connected to the trunk and the lighting modules for sensing lighting conditions associated with each module and/or an ambient space about the tree trunk. The optical sensor may be operable to transmit lighting data that it senses to the controller so that the controller automatically manipulates the lighting effect of one or more of the lighting modules between one of a plurality of single colors or one of a plurality of predetermined patterns.

The controller in this regard may be a manual inline controller or may be wirelessly connected to the lighting modules. The controller may therefore be a smart phone, tablet, personal computer, or a separate RF controller, and wherein the controller has a user interface to receive user input and manipulate the lighting effect of each lighting module so that each module radiates one of a plurality of single colors or one of a plurality of predetermined patterns.

The foregoing summarizes only a few aspects of the present disclosure and is not intended to be reflective of the full scope of the present disclosure. Additional features and advantages of the present disclosure are set forth in the following detailed description and drawings, may be apparent from the detailed description and drawings, or may be learned by practicing the present disclosure. Moreover, both the foregoing summary and following detailed description are exemplary and explanatory and are intended to provide further explanation of the presently disclosed technology as claimed.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
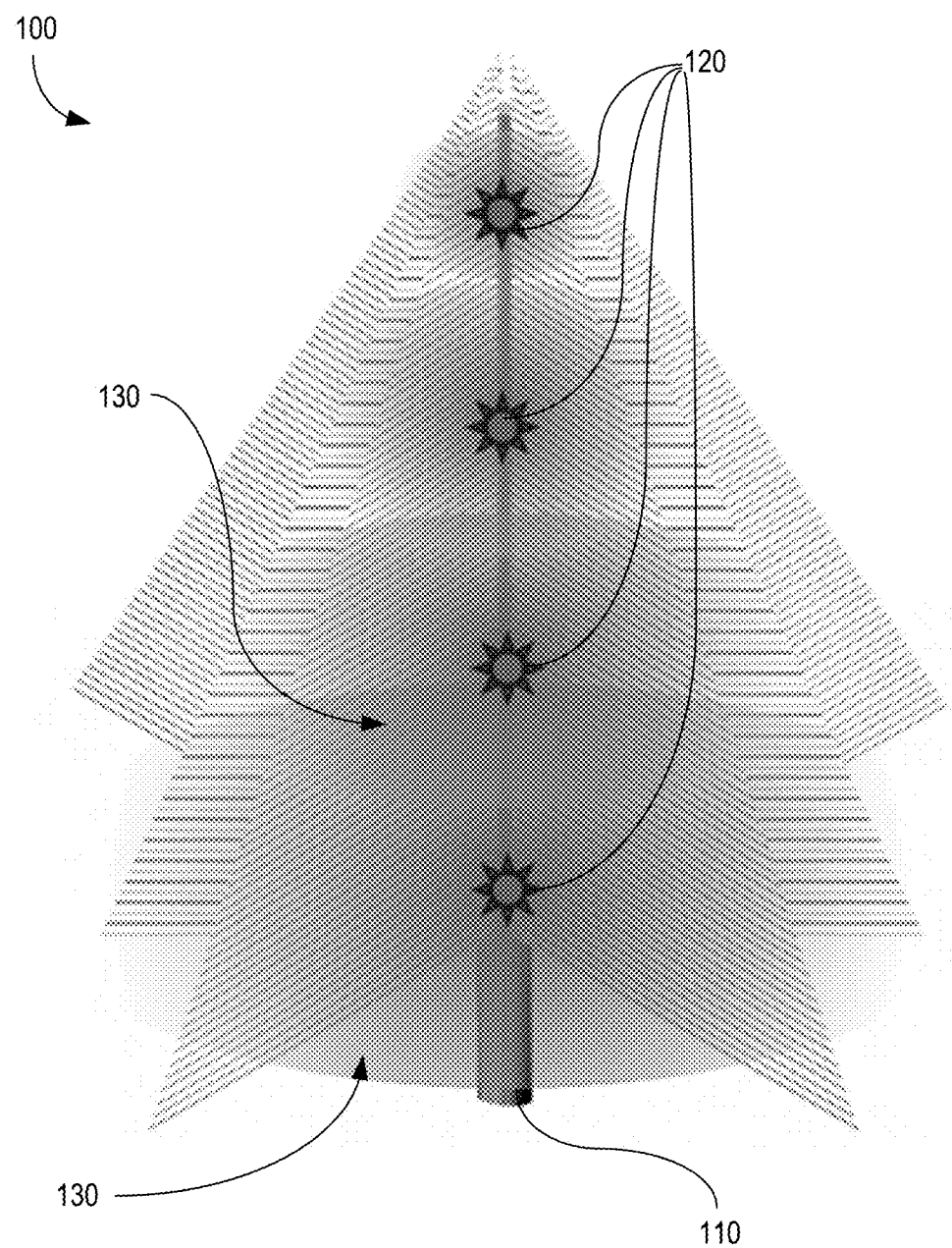
FIG. 1 is a schematic view of assembled trunk sections with illumination systems, in accordance with some embodiments of the present disclosure.

Embodiments of the present disclosure relate to artificial Christmas trees. Although preferred embodiments of the disclosed technology are explained in detail, it is to be understood that other embodiments are contemplated. Accordingly, it is not intended that the disclosure is limited in its scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Figure 2:
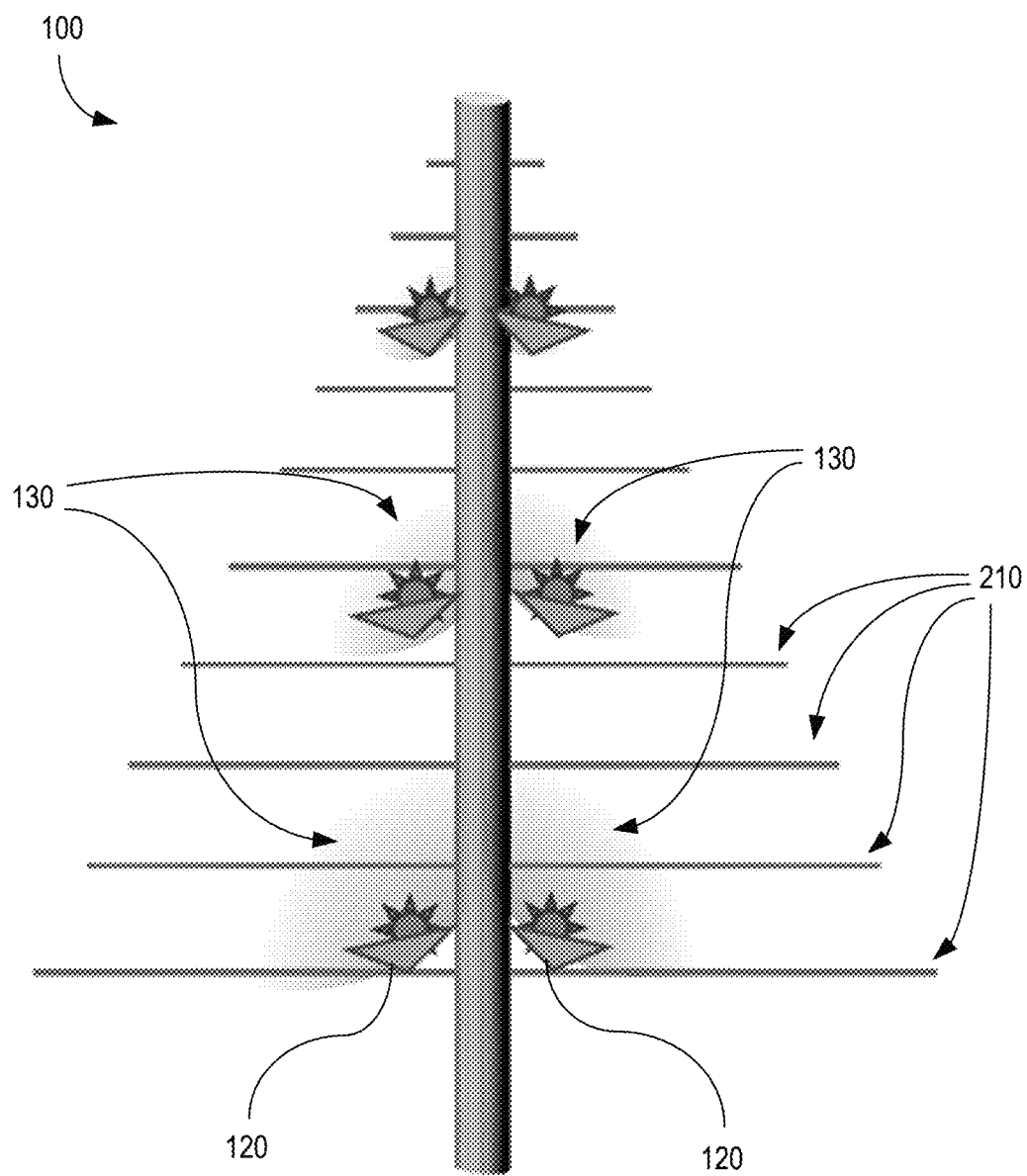
FIG. 2 is a schematic view of assembled trunk sections having illumination systems, in accordance with some embodiments of the present disclosure.

To facilitate an understanding of the principles and features of the disclosed technology, various illustrative embodiments are explained below. In particular, the presently disclosed subject matter is described in the context of being an illumination system 100 for an artificial tree. FIGS. 1 and 2 are schematic views of an assembled example embodiment of the illumination system 100. As shown, the illumination system 100 may include one or a plurality of lighting modules 120 distributed along the trunk 110. The trunk 110 may be an elongate member that is partially or completely hollowed out and operable to be securely mounted on or to a ground surface or a base (not depicted), which may be connected to trunk 110.

Each lighting module 120 may be fixedly or detachably connected to the trunk 110 at one or a plurality of positions thereon. In this regard, a lighting module 120 may be attached to an outer surface of the trunk 110, an inner surface of the trunk 110, or some combination thereof. As discussed more particularly below, each lighting module 120, individually or collectively, may provide an internal lighting and/or glowing effect 130 that radiates outward from the center of the tree. The number of lighting modules 120 included in the illumination system 100 may vary depending on need or preference. For example, more than one lighting module 120 can be placed in the same section of a trunk 110 to produce a larger glowing effect 130 that illuminates a larger volume of a particular section of the tree.

Figure 3:
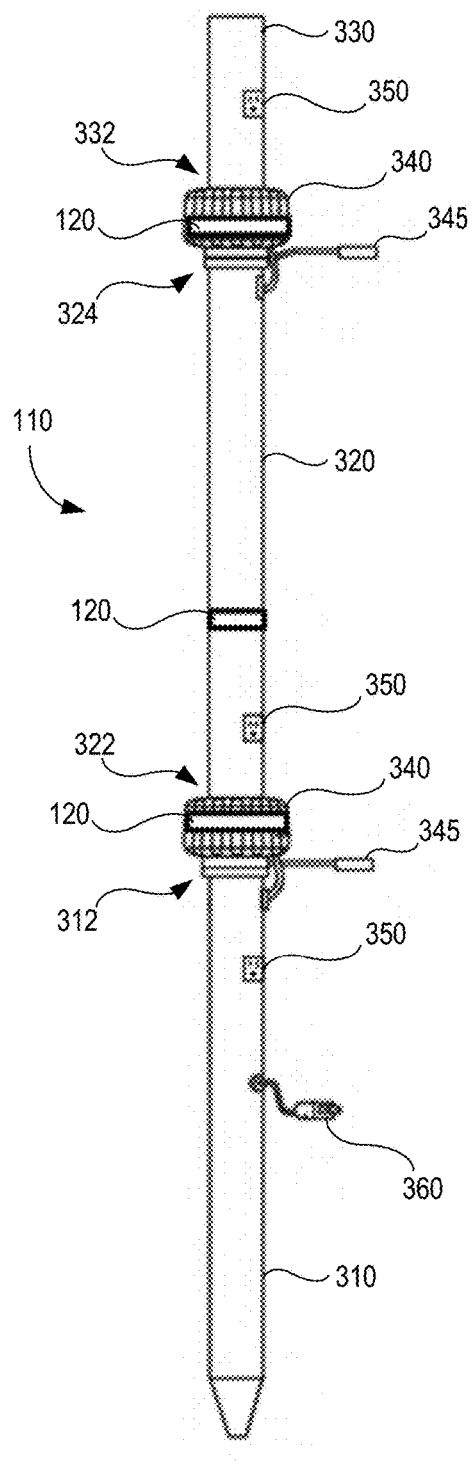
FIG. 3 is a side view of assembled trunk sections having couplers for receiving lighting modules, in accordance with some embodiments of the present disclosure.

It is contemplated that the trunk 110 may be constructed out of polyvinyl chloride ("PVC") or other plastics, wood, metal or other hard materials that can maintain the structural integrity of the trunk 110 and any elements mounted thereon or assembled therewith (e.g., branches 210, a lighting module 120, other lights, and/or ornaments associated with branches 210). The size of the trunk 110, particularly the height and diameter of its body, may vary based on desired characteristics such as the height of the room where the tree will be stored and the size and number of accessories available for decorating tree. While the trunk 110 may be one single piece, in some embodiments, it may be a multi-piece trunk 110, as shown in FIG. 3 (e.g., a quick-connection tree system). Specifically, FIG. 3 is an external, side view of an assembled tree trunk 110 that can be used with the illumination system 100. The tree trunk 110 in FIG. 3 includes three trunk sections 310, 320, 330 assembled and physically connected to one another to form the trunk 110 of an artificial tree.

A sleeve system may be used with trunk sections 310, 320, 330 to secure one trunk section 310, 320, 330 to another such that a tapered section of each male end may be inserted into a larger diameter female end of a neighboring trunk section 310, 320, 330. In some embodiments, an end 312 of a first trunk section 310 is male, and a first end 322 of a second trunk section 320 is female, or vice versa. In some embodiments, a second end 324 of the second trunk section 320 is male, and an end 332 of a third trunk section 330 is female, or vice versa. In certain embodiments, the lighting modules 120 can be electrically connected to an external power supply; such embodiments may include one or more power outlets 150 and a power cord 160 to provide electrical communication between one, some, or all trunk sections 310, 320, 330; one, some, or all lighting modules 120; and/or the external power supply. In some embodiments, the trunk sections 310, 320, 330 may include electrical connectors that are at least partially disposed therein, such a single power source can provide power to one of the sections and the trunk sections 310, 320, 330 can be in electrical communication with one another without the need for traditional power cords to be connected or attached to each of (or any of) the trunk sections 310, 320, 330.

As can be seen, one or more couplings 340 also may be concentrically attached to the trunk 110. Each coupling 340 may be rigidly positioned to one location on the trunk 110 or may be slidably disposed or capable of being removed and repositioned at a plurality of locations along the trunk 110. In some embodiments, one, some, or all of the couplings 340 may also include a fastener for receiving one or more lighting modules 120 thereon. The fastener of the coupling 340 may include one or more fastener mechanisms operable to securely engage the coupling 340 with a lighting module 120, such as one or more bolts, clamps, couplings, hooks, pins, latches, magnets, or the like. In some embodiments, the coupling 340 can attach to a collar attached to the trunk 110, and the collar may include a plurality of branches 210. In certain embodiments, the coupling 340 can be attached directly to a trunk section 310, 320, 330.

Some embodiments may further include a light sensor 345 that is operable to sense surrounding light conditions. In some embodiments, the light sensor 345 is further operable to transmit sensed light conditions to a controller. In some embodiments, such as the example embodiment shown in FIG. 3, the light sensor 345 may be separate from the lighting module 120. In some embodiments, the light sensor 345 may be electrically and/or mechanically attached to the lighting module 120. In some embodiments, the light sensor 345 is integral with the lighting module 120.

According to some embodiments, upon the light sensor 345 sensing ambient light above or below a first predetermined threshold, the controller may be configured to power on one or more lighting modules 120 such that a glowing effect 130 is provided. In some embodiments, upon the light sensor 345 sensing ambient light above or below a second predetermined threshold, the controller may be configured to increase, decrease, or otherwise alter the light output of one or more lighting modules 120 such that the glowing effect 130 is adjusted. For example, in some embodiments, at a certain level of sensed ambient light, the controller may power on all lighting modules 120. Once the sensed ambient light decreases to a certain level, for example, the controller may decrease the glowing effect 130, which may prevent the glowing effect 130 from becoming too bright in comparison to the now darker environment. Continuing the example, as the sensed ambient light increases, the controller may be configured to increase the glowing effect 130.

In some embodiments, the controller may be configured to adjust the glowing effect according to a substantially positive correlation between the sensed ambient light and the intensity of the glowing effect (i.e., increase the glowing effect 130 as the sensed ambient light increases and decrease the glowing effect 130 as the sensed ambient light decreases). In some embodiments, the controller may be configured to adjust the glowing effect according to a substantially negative correlation between the sensed ambient light and the intensity of the glowing effect (i.e., decrease the glowing effect 130 as the sensed ambient light increases and increase the glowing effect 130 as the sensed ambient light decreases). In certain embodiments, the controller may be configured to adjust the glowing effect 130 based on a relationship to the amount of sensed ambient light that is more complex than a positive or negative correlation. To decrease the glowing effect 130, the controller may be configured to power off some of the lighting modules 120 and/or decrease the intensity of the light output by some or all of the lighting modules 120. Alternately, to increase the glowing effect 130, the controller may be configured to power on some of the lighting modules 120 and/or increase the intensity of the light output by some or all of the lighting modules 120. In some embodiments, the controller may adjust the glowing effect 130 when the sensed ambient light crosses a predetermined threshold, and in some embodiments, the controller may adjust the glowing effect 130 on a substantially continuous basis depending on the amount of light sensed by the light sensor 345 and/or when the sensed ambient light is within a predetermined range of values.

Figure 4:
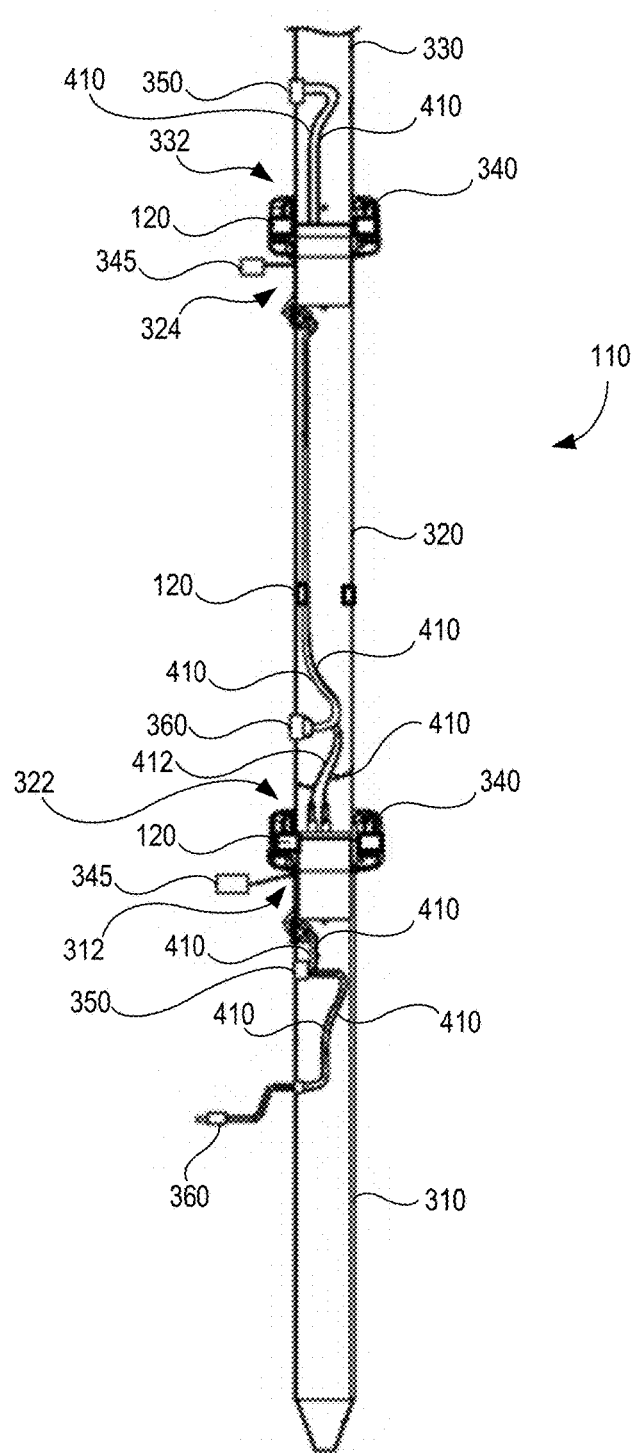
FIG. 4 is a cross-sectional side view of assembled trunk sections having couplers for receiving lighting modules, in accordance with some embodiments of the present disclosure.

FIG. 4 is a cross-section view of an example embodiment of an assembled tree trunk 110 including lighting modules 120 electrically connected with an external power supply. As shown in FIG. 2, the female end 312 of the first trunk section 310 may be configured to mate with the male end 322 of the second trunk section 320 via the coupling 340. The example embodiment shown in FIG. 2 also depicts the second trunk section 320 as including a female end 324 opposite the male end 322, and the female end 324 of the second trunk section 320 may be configured to mate with a male end 332 of a third trunk section 330 via another coupling 340. In some embodiments, the tree trunk 110 may include more than three trunk section, and may, for example and not limitation, include four, five, six, or more trunk sections. In such embodiments, a male end of a particular trunk section may mate with the female end of an adjacent trunk section, and so on, as described above. Additionally, as described above, each pair of ends (e.g., end 312 of the first trunk section 310 and end 322 of the second trunk section 320, end 324 of the second trunk section 320 and end 332 of the third trunk section 330) requires only that one end be male and one end be female. It is to be noted that this disclosure contemplates the each end being either male or female, provided the mating end of the adjacent tree section is of the opposite gender.

In some embodiments, such as the configuration depicted in FIGS. 3 and 4, each lighting module 120 may be disposed in a different trunk section 310, 320, 330 of the tree trunk 110 and may be electrically connected to each other and/or an external power supply. The first trunk section 310 may have wires 410 disposed within, which may be connected to electrical contacts of a first coupling 340 connected to an end 312 of the first trunk section 310. The electrical contacts of the first coupling 340 may be configured to pass a flow of electricity to electrical contacts of a second coupling 340 connected to an end 322 of the second trunk section 320, which in turn pass the flow of electricity to wires 410 that are at least partially disposed within the second trunk section 320. The wires 410 in the second trunk section 320 may extend to a third coupling 340 located at the opposite end 324 of the second trunk section 320.

Between the two ends of the second trunk section, the wires 410 may be connected to additional wires 410, which may be configured to pass a flow of electricity to one or more power outlets 350. In some embodiments, the additional wires 410 may be configured to pass a flow of electricity directly to one or more lights or other ornaments. Electrical contacts of the third coupling 340 located at the end 324 of the second trunk section 320 may be placed in electrical communication with electrical contacts of a fourth coupling 340 located at an end 334 of the third trunk section 330, which may be configured to pass a flow of electricity to wires 410 that are at least partially disposed within the third trunk section 330 and are connected to one or more power outlets 350, other features of the present disclosure and/or additional devices. Proximate the lowest trunk section (as shown, trunk section 310), a power cord 360 may extend from the tree trunk 110 and may be connectable to an external power supply (e.g., a wall outlet).

Thus, the wires 410, in certain embodiments, may enable electricity to flow from a power source, through the tree trunk 110, and to the illumination system 100. The lighting modules 120 can therefore be illuminated when power is supplied to the tree trunk 110. The one or more electrical outlets 350, which may be provided along the length of the tree trunk 110, may be configured to receive power from wires 410 to provide a user with the ability to plug in additional lighting modules 120 as needed or required. By providing convenient locations to plug in lights, the amount of effort required to decorate a tree and/or impart the herein disclosed lighting effect can be minimized.

As noted above, some embodiments may include one or more sections of the tree trunk 110 that has a power cord 360 for receiving power from an outside power source, such as a wall outlet. The power cord 360 may be configured to engage a power source and distribute power to the rest of the tree. More specifically, power can flow from the wall outlet, through the power cord 360, through the one or more power distribution subsystems disposed within the tree trunk 110 to one or more lighting modules 120 of the illumination system 100.

Figure 5:
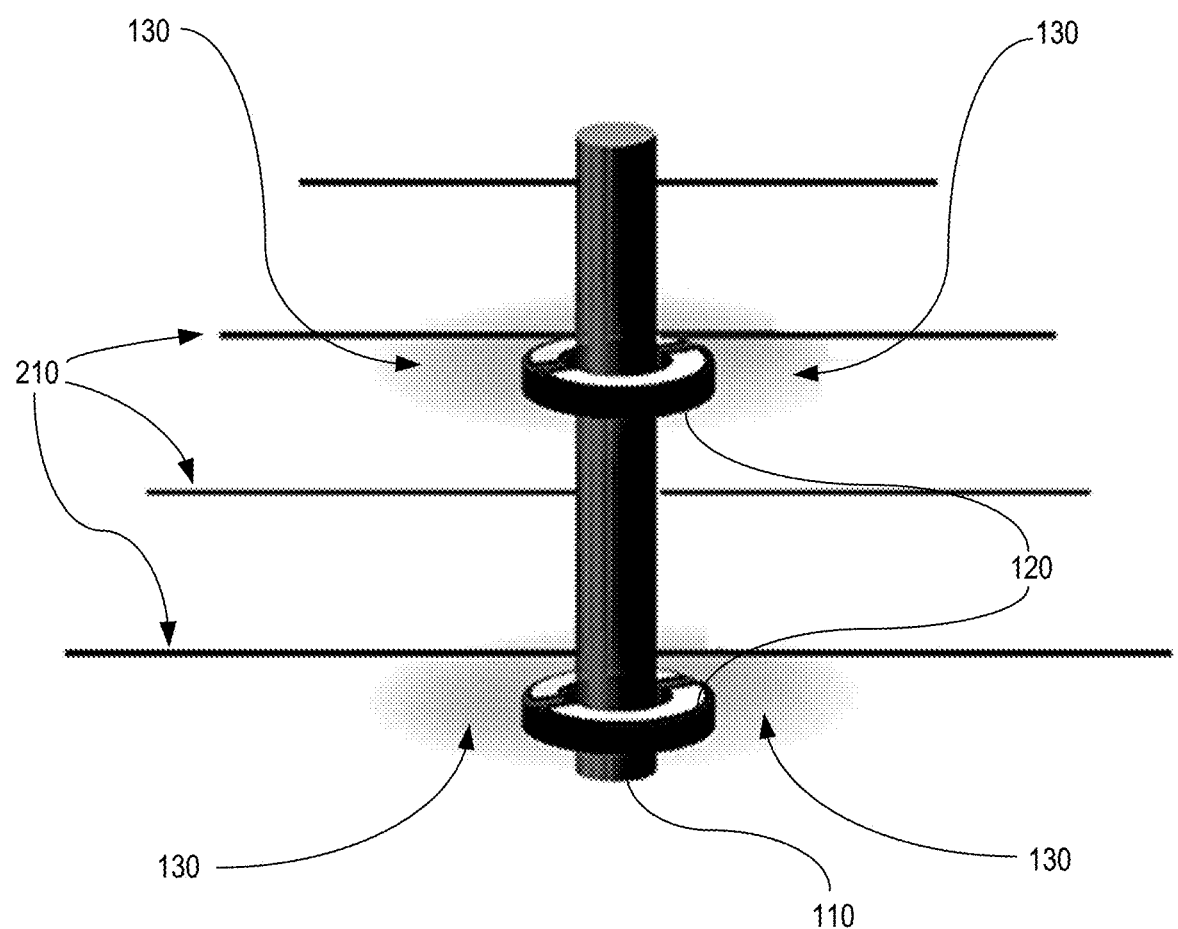
FIG. 5 is a schematic view of lighting modules assembled trunk sections, in accordance with some embodiments of the present disclosure.
Figure 6:
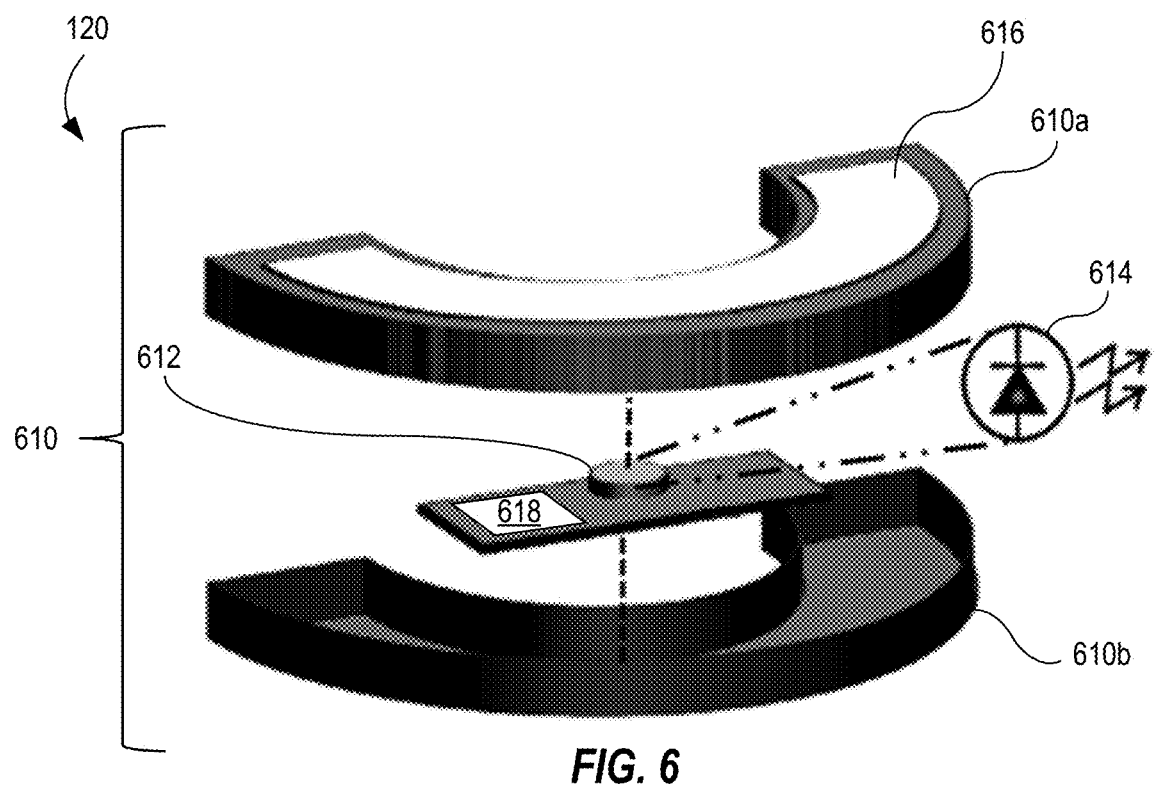
FIG. 6 is an exploded view of a lighting module with an LED, in accordance with some embodiments of the present disclosure.
Figure 7:
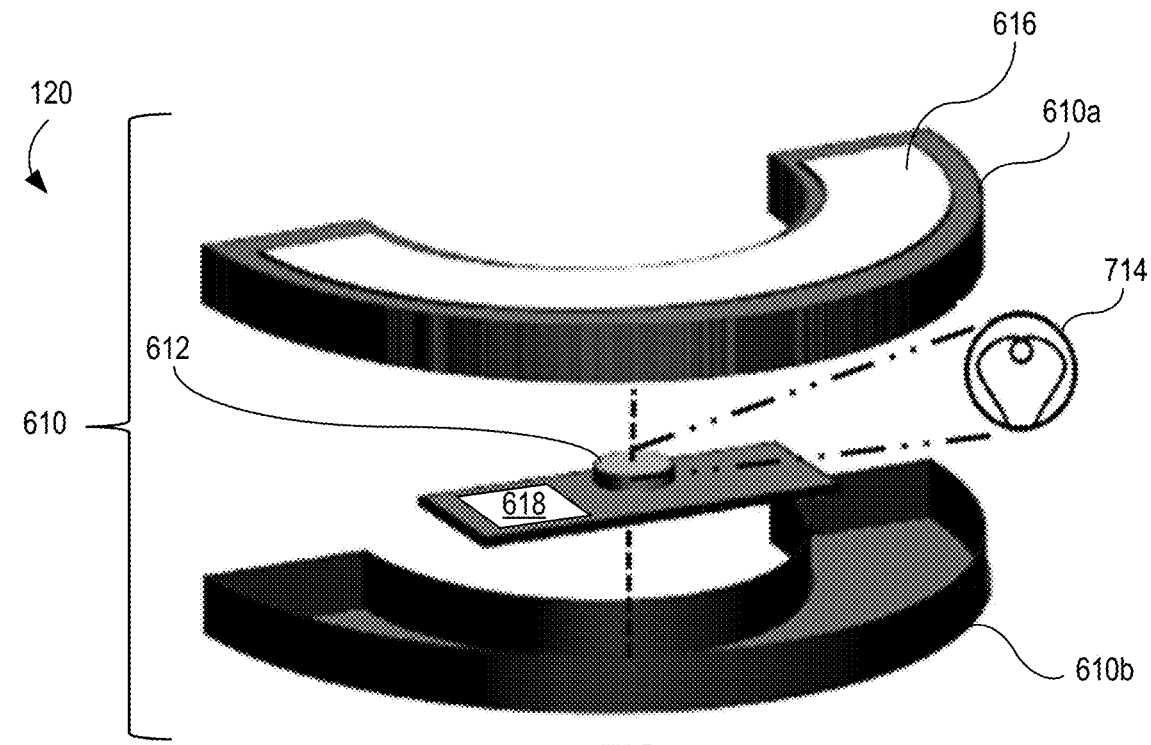
FIG. 7 is an exploded view of a lighting module with an incandescent bulb, in accordance with some embodiments of the present disclosure.

FIG. 5 depicts a perspective view of a schematic drawing of an example embodiment of a tree trunk 110 including an illumination system 100 and four representative branches 210 that are extending outwardly from the tree trunk 110. In certain embodiments, such as the example embodiment shown in FIG. 5, a pair of exemplary lighting modules 120 can be concentrically attached to an outer surface of tree trunk 110 and a glowing effect 130 may be visibly emitted from each lighting module 120. While FIG. 5 depicts the lighting modules 120 as being concentric with tree trunk 110, the present disclosure is not so limited. In some embodiments, the lighting module 120 may be partially concentric with tree trunk 110 as shown in FIGS. 6 and 7. In other embodiments, the lighting module 120 may take any shape or form to attach onto the outer surface of the tree trunk 110. In certain embodiments, the lighting module 120 may be of any appropriate shape or form such that the lighting module 120 can be attached to an inner void of a trunk section of tree trunk 110. For example, the previously described coupling 340 can have a planar receiver for easy, detachable fastening of a lighting module 120 thereon with the lighting module 120 being in any shape or design.

FIG. 6 is an exploded perspective view of an example embodiment of a lighting module 120. As can be seen, the lighting module 120 can include a housing 610 formed from an upper portion 610a and a lower portion 610b that are operable to be removably or permanently engaged with each other to form a void or chamber to receive or contain a lighting device 612. In some embodiments, the upper portion 610a and lower portion 610b may be closed at one end and open at an opposing end and may be operable to slidably connect to one other. In some embodiments, a fastener may be included to easily and securely attach the upper portion 610a to the lower portion 610b to form the housing 610. In some embodiments, the upper portion 610a may be connected to the lower portion 610b via glue, welding, soldering, brazing, or any other attachment means as will be apparent one of skill in the art. Further, the housing 610 may be any shape or design as desired or necessary. In some embodiments, the housing 610 may be an integral, one-piece unit or may include more than the two pieces described above and shown in FIGS. 6 and 7 (i.e., the upper portion 610a and lower portion 610b). Further, the housing 610 may be completely circular, hemispherical, box-shaped, or any other shape operable to attach to the tree trunk 110.

In some embodiments, the lighting device 612 may include one or more light-emitting diodes (LEDs) 614, as shown in FIG. 6. While only one LED 614 is depicted in FIG. 6, multiple LEDs 614 may be used and arranged in any pattern or shape as desired or required. In some embodiments, the LEDs 614 may be added or removed to manipulate the overall glowing effect 130 of the illumination system 100 and/or to manipulate the glowing effect 130 associated with an individual lighting module 120. In this regard, one or more LEDs 614 may be electrically connected at any point in or on housing 610. In certain embodiments, the LED 614 and/or other accessories may be permanently or temporarily attached to housing 610. For example, an LED 614 may be soldered, welded, or held by a holding apparatus to establish and maintain an electrical connection and/or a desired location of the LED 614. In some embodiments, it is contemplated that the LED 614 may be configured to snap onto or into the housing 610 to establish an electrical connection. In some embodiments, the lighting device 612 may include a controller 618, which is discussed in more detail below. Though not shown, housing 610 may also include one or more batteries in electrical communication with the LEDs 614, minimizing or eliminating any need for the lighting module 120 to be connected to an external power source.

In certain embodiments, the lighting module 120 may also include an optical device 616 that may be operable to manipulate the glowing effect 130 of some or all corresponding LEDs 614 to evenly distribute light from the LEDs 614 of the housing 610. While FIGS. 6 and 7 depict the optical device 616 as being located on an upper surface of the housing 610, the present disclosure is not so limited. In certain embodiments, the optical device 616 is a separate device that is installed at a location on the tree trunk 110 different than that of the lighting modules 120. In various embodiments, the optical device 616 may be attached to, a part of, or integral with the lighting module 120. In some embodiments, the optical device 616 may be located anywhere desired or required for optimal light manipulation. In certain embodiments, the optical device 616 may be operable to soften the light provided by the lighting module 120. According to some embodiments, the optical device may be configured to distribute light according to various considerations including a desired brightness and/or a desired softness of the glowing effect 130. In certain embodiments, the optical device 616 may include a light filter. In some embodiments, the optical device may be colored, tinted, or otherwise designed such that the glowing effect 130 is of a certain color or hue. In some embodiments, the optical device 616 may include a light diffuser. In some embodiments, the optical device 616 may reflect, refract, diffuse, and/or diffract light. In certain embodiments, the housing 610 may include an aperture, and the optical device 616 may be attached to or inserted into a portion of the housing 610 such that it covers at least a portion of the aperture. In some embodiments, some or all of the housing 610 may be designed and manufactured such that the housing 610 itself acts as an optical device 616.

FIG. 7 is an additional exploded perspective view of a lighting module 120, according to embodiments of the present disclosure. The example embodiment of a lighting device 612 shown in FIG. 7 includes one or more incandescent bulbs 714 in lieu of the LEDs 614 included in the example embodiment shown in FIG. 6. Some embodiments may include a combination of one or more LEDs 614, one or more incandescent bulbs 714, and/or one or more other applicable lighting accessories. Similar to the embodiment shown in FIG. 6, one or more incandescent bulbs 714 may be electrically connected at any point in or on the housing 610. In certain embodiments, the incandescent bulb 714 and/or other accessories may be permanently or temporarily attached to housing 610. For example, the incandescent bulbs 714 may be soldered, welded, or held by a holding apparatus to establish and maintain an electrical connection and/or desired location. In some embodiments, the incandescent bulbs 714 may be configured to snap onto or into the housing 610 to establish an electrical connection. Though not shown, the housing 610 may also include one or more batteries in electrical communication with the incandescent bulbs 714, minimizing or eliminating any need for the lighting module 120 to be connected to an external power source.

Each lighting module 120 may include a single color, multiple colors, and/or one or more predetermined patterns, colors, shapes, designs, or the like. Each lighting module 120 also may be evenly or unevenly positioned on the tree trunk 110. In certain embodiments, the illumination system 100 can include a multicolor type of lighting device 614 (e.g., RGB LED). In some embodiments, the color, intensity, and/or pulsing of one, some, or all of the lighting modules 120 included in an illumination system 100 may follow a predetermined phase or pattern. In some embodiments, the color, intensity, and/or pulsing of one, some, or all of the lighting modules 120 can be manipulated by a user via handheld control device 910, as discussed below. In some embodiments, the illumination system 100 may be capable of controlling the lighting modules 120 to output corresponding glowing effects 130 that display the same color, multiple colors, and/or one or more predetermined patterns, colors, shapes, designs, or the like.

Figure 8A:
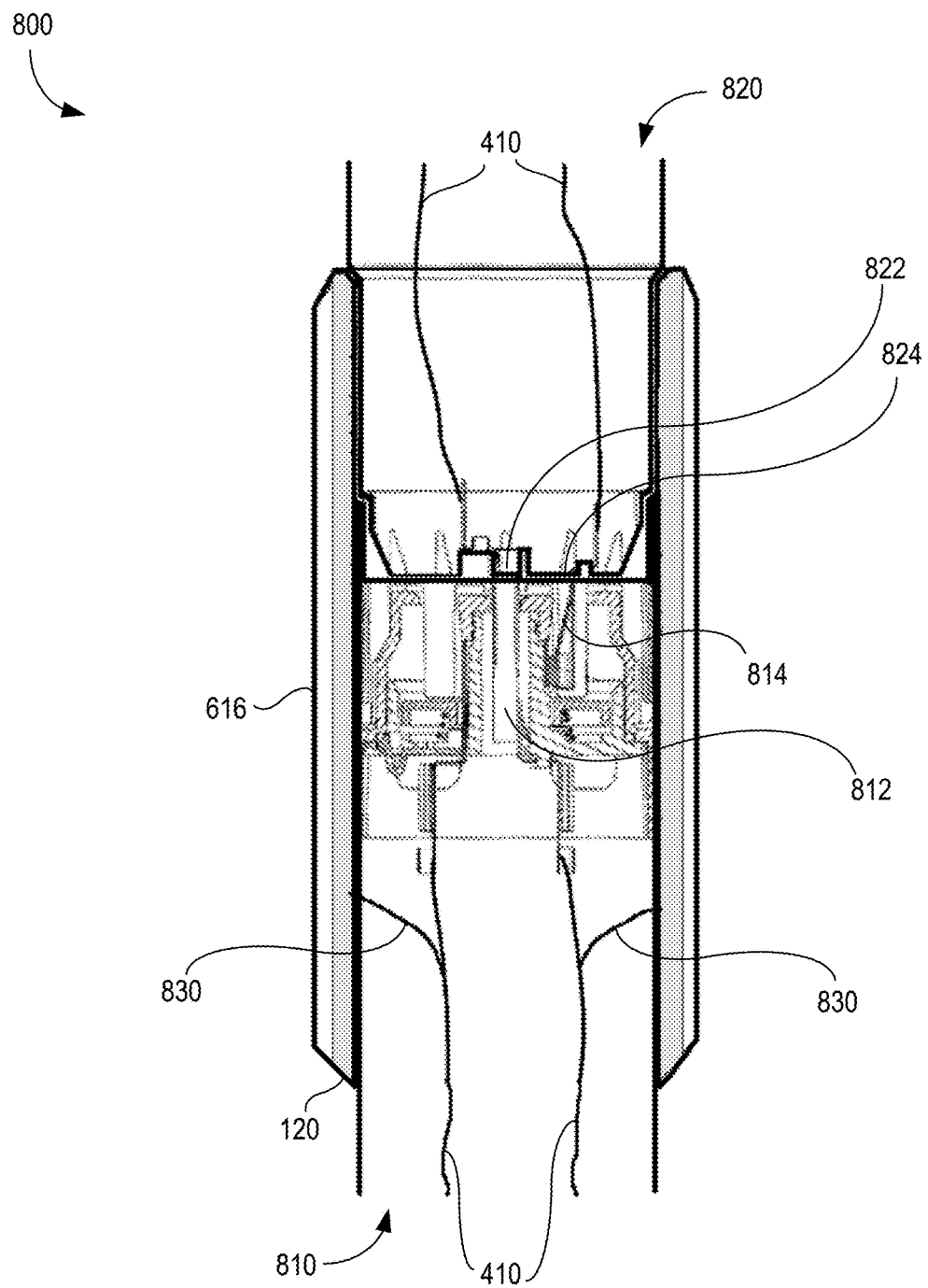
FIGS. 8A and 8B are cross-sectional views of a connector system and power distribution system included substantially within a tree trunk that provides power to a lighting module, in accordance with some embodiments of the present disclosure.
Figure 8B:
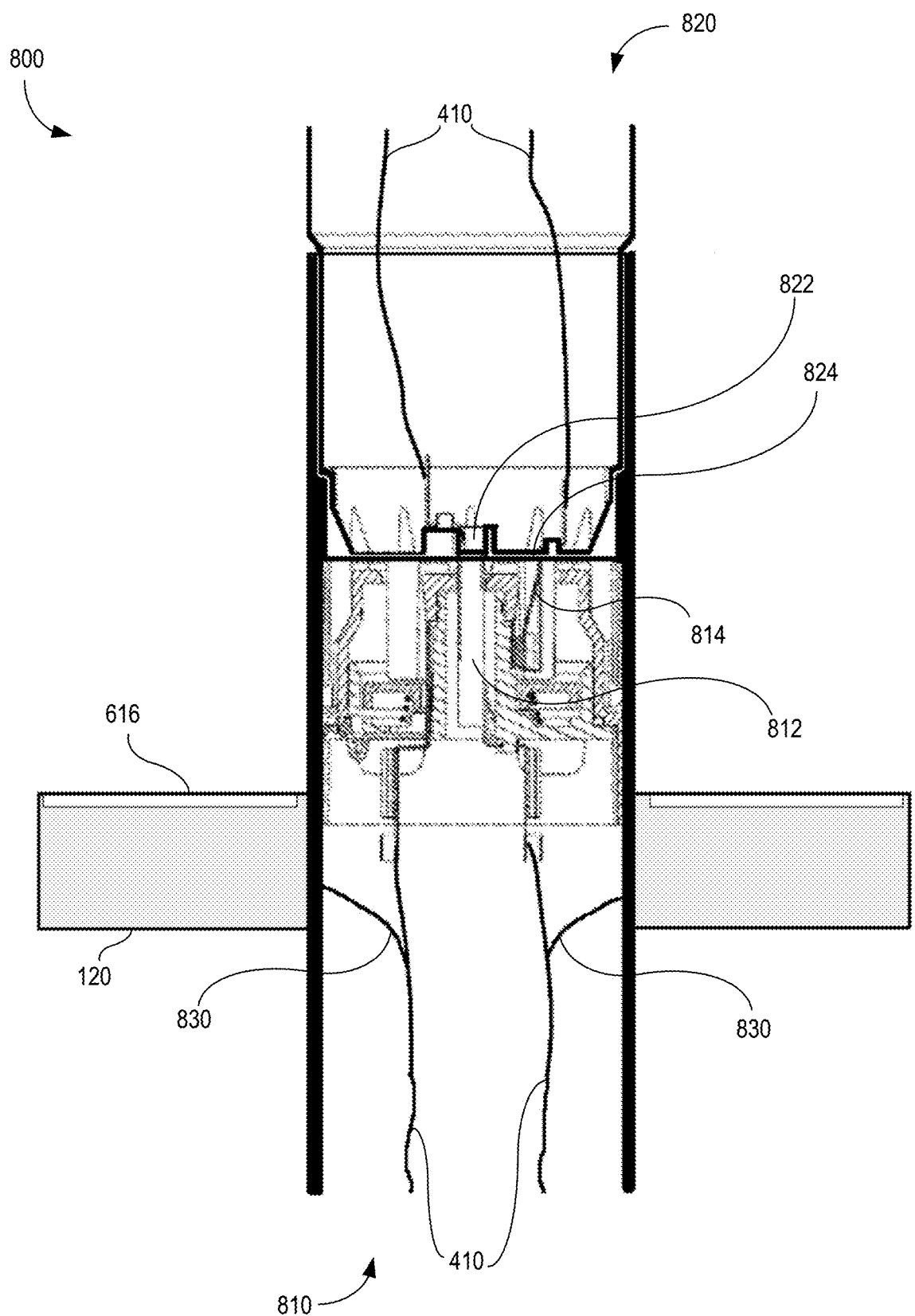

Turning to FIGS. 8A and 8B, certain embodiments of the present disclosure may include a connector system 800 that may include a power distribution system that is included substantially within the tree trunk 110. In some embodiments, a female end 810 of a trunk section (e.g., 310, 320, 330) can have one or more electrical contact devices for receiving power from, or distributing power to, a male end 820 of a power distribution system of a trunk section (e.g., 310, 320, 330). The female end 810 can comprise central contact device 812 for engaging with a prong 822 of a male end and channel contact device 814 for engaging with another prong 824 of a male end. In some embodiments, the central contact device 812 and channel contact device 814 can be located inside hollows or apertures that receive and engage with other electrical connectors, such as prongs, and enable the electrical connectors to conduct electrical power through the trunk section 310, 320, 330. In some embodiments, the central contact device 812 can be located proximate the center of the female end 810. The channel contact device 814, therefore, can be a round or circular channel that encircles the central contact device 812. Accordingly, the central contact device 812 can be located proximate the center of the channel contact device 814.

In some embodiments, the male end 820 of a trunk section 310, 320, 330 can have one or more prongs for receiving power from, or distributing power to, a female end 810 of a power distribution system of another trunk section 310, 320, 330. In some embodiments, the male end 820 comprises two prongs. A first prong can provide a "positive" flow path for electricity and a second prong can provide a "negative" flow path for electricity.

In certain embodiments, the male end 820 can have a central male prong 822 and a channel male prong 824. In some embodiments, central male prong 822 can be sized and shaped to engage central contact device 812, and channel male prong 824 can be sized and shaped to engage channel contact device 814. In some embodiments, when central male prong 822 and channel male prong 824 of the male end 820 are abutting or otherwise in electrical connection with the central contact device 812 and channel contact device 814 of the female end 810, respectively, electrical power can be conducted from male end 820 to female end 810 (or vice versa, depending on the direction of electrical power flow). In this manner, electrical power can be conducted from a first power distribution system in a first trunk section 310, 320, 330 to a second power distribution system in a second trunk section 310, 320, 330.

In some embodiments, the channel contact device 814 is disposed in a circular manner around central contact device 812, alleviating any issues concerning the angular rotation of the male end 820 and the female end 810 during assembly. More specifically, the channel male prong 824 can be inserted at any number of positions or locations along the channel contact device 814, establishing and maintaining electrical connectivity between female end 810 and male end 820 regardless of the angular position of the male end 820 with respect to that of the female end 810.

To provide effective electrical connectivity, in some embodiments, the central male prong 822, the channel male prong 824, the central contact device 812, and the channel contact device 814 can comprise electrically conductive material. In some embodiments, for example, the center male prong 822, the channel male prong 824, the central contact device 812, and the channel contact device 814 can comprise one or more of copper, copper alloy, or any other conductive material.

In certain embodiments, the male end 820 of a trunk section 310, 320, 330 may not be limited to two prongs or electrical contacts but may have three, four, or more prongs or electrical contacts, which may align with an equal number of electrical contacts (which may include contact devices 812, 814) of the female end 810 of another trunk section 310, 320, 330. When the male end 820 of a trunk section 310, 320, 330 is inserted into the female end 810 of another trunk section 310, 320, 330, the electrical contacts of the male end 820 may abut or otherwise be in electrical connection with the electrical contacts of the female end 810, such that an electrical connection is created and maintained.

In some embodiments, a separate wire 410 may be connected to each electrical contact, and additional wires 830 may be spliced or other otherwise connected to the wires 410 that are connected to an electrical contact. The additional wires 830 may be connected to a lighting module 120, such that, when the power distribution system is in electrical communication with a power source, power is provided to the lighting module 120. This in turns provides power to any LED 616, incandescent bulb 716, or other feature or device contained within the lighting module 120 or in electrical communication with the lighting module 120. FIG. 8A shows an example embodiment in which the lighting module 120 has a low profile, and FIG. 8B shows an example embodiment in which the lighting module 120 has a profile similar to that of the example embodiments depicted in FIGS. 6 and 7.

In some embodiments, the lighting module 120 is integral with, affixed, or permanently attached to a trunk section 310, 320, 330. In some embodiments, the lighting module 120 is detachably attachable to a trunk section 310, 320, 330. In such embodiments, each additional wire 830 may be in electrical communication with an electrical contact extending to the exterior surface of the trunk section 310, 320, 330. The lighting module 120 may be connected to the trunk section 310, 320, 330 such that one or more electrical contacts located on an exterior surface of the lighting module 120 may align with one or more electrical contacts of the trunk section 310, 320, 330, establishing electrical communication between the trunk section 310, 320, 330 and the lighting module 120, and maintain that electrical communication until the lighting module 120 is detached from the trunk section 310, 320, 330. In some embodiments, the electrical contacts of the trunk section 310, 320, 330 may be positioned at a particular location along the trunk section 310, 320, 330. In certain embodiments, the electrical contacts of the trunk section 310, 320, 330 may extend for some distance along the trunk section 310, 320, 330 such that the lighting module may attached to the trunk section 310, 320, 330 at a plurality of locations but still be in electrical communication with the power distribution system of the trunk section 310, 320, 330.

Figure 9:
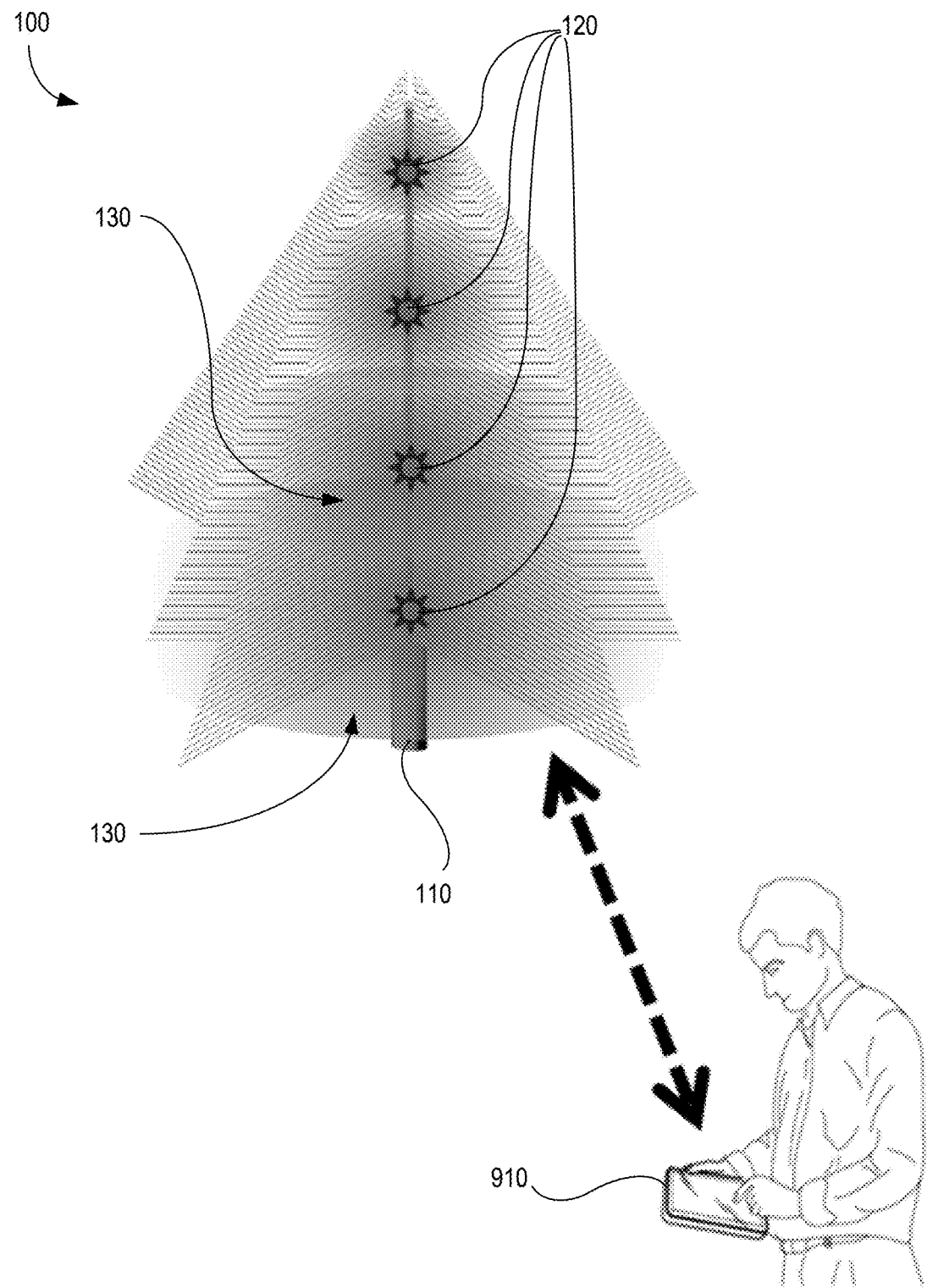
FIG. 9 is a schematic overview of assembled trunk sections with the illumination system remotely connected to a controller, in accordance with some embodiments of the present disclosure.

FIG. 9 is a schematic of an example embodiment of the illumination system 100 being controlled by a user with an example embodiment of the handheld control device 910. As can be seen, the handheld control device 910 may be wirelessly connected to the illumination system 100, including one or more lighting modules 120, as well as with any external computing device remotely or directly connected therewith. In certain embodiments, the handheld control device 910 may be an RF controller, a smartphone, tablet, laptop, desktop computer, or the like. In some embodiments, the handheld control device 910 may be wirelessly connected to a controller of the illumination system 100 through radio waves such as through wireless LAN, Bluetooth, interoperable implementations of the IEEE 802.16 family of wireless-networks standards ratified by the WiMAX Forum (WiMAX), Long-term Evolution (LTE), High-Speed Downlink Packet Access (HSDPA). In some embodiments, the handheld control device 910 may operatively communicate with the controller of the illumination system 100 through an application installed on the handheld control device 910. In some embodiments, the handheld control device 910 may have a user interface for receiving input from a user and transmitting this input to the controller of the illumination system 100, causing the controller to manipulate one or more lighting modules 120 independently or in one or more combinations with each other. According to some embodiments, the controller may include a storage and a processor.

According to some embodiments, the controller may be a microcontroller or a microprocessor. The controller may be configured to control the lighting devices 612 to produce a glowing effect 130. In some embodiments, the controller may be configured to receive signals from the handheld control device 910, one or more light sensors 345, or another source. According to some embodiments, the controller may be configured to covert these received signals to converted signals and may send the converted signals to the LEDs 616, incandescent bulbs 716, or the like. In some embodiments, the control may be connected or attached to the lighting module 120. In some embodiments, the controller may be included on or within the housing 610 of the lighting module 120. In certain embodiments, the controller may be connected to and/or operable to control a plurality of lighting modules 120. In some embodiments, the controller may be located on or within a trunk section (e.g., 310, 320, 330) and may be configured to control one or more lighting modules 120.

The internal lighting glowing effect 130 associated with the illumination system 100 can include one or multiple colors associated with each lighting module 120 and/or the illumination system 100 altogether. In some embodiments, the glowing effect 130 can be controlled by or with the handheld control device 910 and/or automatically manipulated by the controller via one or more optical devices 616 and/or lighting devices 612. For example, the handheld control device 910 can manipulate the glowing effect 130 such that each lighting module 120 radiates one of a plurality of single colors and/or one of a plurality of predetermined patterns, colors, shapes, designs, or the like. As discussed above, some embodiments may include one or more light sensors 345 that may be operatively connected to the tree trunk 110 and may be configured to sense lighting conditions associated with one, some, or all lighting modules 120 and/or an ambient environment about the tree trunk 110. Each light sensor 345 may transmit sensed lighting data to the lighting modules 120 of the illumination system 100 to automatically adjust a local glowing effect 130 (i.e., the glowing effect 130 of one lighting module 120 or a portion of the lighting modules 120) or the overall glowing effect of the entire illumination system 100. In some embodiments, the controller may receive sensed lighting data from the light sensor 345 such that the controller can automatically manipulate a local glowing effect 130 or an overall glowing effect of the entire illumination system 100 to radiate one or more of a plurality of single colors and/or one or more of a plurality of predetermined patterns, colors, shapes, designs, or the like. In some embodiments, the controller may receive signals from the handheld control device 910, which may instruct the controller to manipulate the local glowing effect 130 or the overall glowing effect of the entire illumination system 100 to radiate one or more of a plurality of single colors and/or one or more of a plurality of predetermined patterns, colors, shapes, designs, or the like. In some embodiments, the handheld control device 910 may directly connect to the illumination system 100.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An artificial tree comprising:
   a plurality of trunk sections, each trunk section of the plurality of trunk sections configured to detachably attach to an adjacent trunk section of the plurality of trunk sections to form a tree trunk; and
   an illumination system operable to provide an internal lighting effect radiating from or near the tree trunk, the illumination system including a first lighting module comprising:
      a housing configured to attach to an outer surface of the tree trunk;
      a light-emitting device; and
      an optical device operable to selectively distribute light emitted from the light-emitting device, the optical device disposed proximate the light-emitting device.

2. The artificial tree of claim 1, wherein the first lighting module is proximate a connection point at which a plurality of branches are attached to the tree trunk.

3. The artificial tree of claim 1, wherein the first lighting module further includes a battery electrically connected to the light-emitting device.

4. The artificial tree of claim 1, wherein the illumination system is electrically connected to a wire, the wire being (i) at least partially contained within a hollow portion of the tree trunk and (ii) configured to receive electricity from an external power supply.

5. The artificial tree of claim 1, wherein the light-emitting device comprises a light-emitting diode.

6. The artificial tree of claim 1, wherein the light-emitting device comprises an incandescent bulb.

7. The artificial tree of claim 1, wherein the housing is configured to detachably attach to a coupling, the coupling configured to attach to the tree trunk.

8. The artificial tree of claim 7, wherein the coupling is adjustable between a plurality of positions along the tree trunk.

9. The artificial tree of claim 1, wherein the illumination system further comprises a second lighting module comprising:
   a housing configured to attach to the outer surface the tree trunk;
   a light-emitting device; and
   an optical device operable to evenly distribute light emitted from the light-emitting device, the optical device disposed proximate the light-emitting device.

10. The artificial tree of claim 9, wherein the internal lighting effect includes one or more colors associated with the first or second lighting modules.

11. The artificial tree of claim 10 further comprising a handheld control device operatively connected to a controller of the illumination system and configured to send signals to the controller that cause the controller to manipulate the internal lighting effect of the first lighting module, the second lighting module, or the illumination system.

12. The artificial tree of claim 11, wherein the handheld control device is a manual inline controller.

13. The artificial tree of claim 11, wherein the handheld control device is wirelessly connected to the illumination system.

14. The artificial tree of claim 11, wherein the controller is configured to manipulate a pattern or the one or more colors of the internal lighting effect of the first lighting module, the second lighting module, or the illumination system.

15. The artificial tree of claim 14, wherein the illumination system further comprises an optical sensor operable to sense lighting conditions, the optical sensor operable to transmit sensed lighting data to at least one of the controller and the handheld control device.

16. The artificial tree of claim 15, wherein the controller is configured to receive the sensed lighting data from the optical sensor and automatically manipulate the internal lighting effect of the first lighting module, the second lighting module, or the illumination system according to a predetermined range of lighting data values.

17. An artificial tree comprising:
   a plurality of trunk segments, each trunk segment of the plurality of trunk segments configured to connect to an adjacent trunk segment in the plurality of trunk segments to form a tree trunk; and
   an internal illumination system comprising a plurality of lighting modules, each lighting module of the plurality of lighting modules (i) comprising a housing and a light emitting device disposed at least partially within the housing, the housing configured to attach to an outer surface of the tree trunk, and (ii) operable to radiate an internal lighting effect, from the tree trunk and via the light emitting device, to form an overall internal lighting effect of the internal illumination system from the tree trunk.

18. The artificial tree of claim 17, wherein the plurality of lighting modules is distributed evenly along the tree trunk.

19. The artificial tree of claim 17, wherein the plurality of lighting modules is distributed unevenly along the tree trunk.

20. An internal illumination system comprising:
   a plurality of lighting modules, each lighting module of the plurality of lighting modules including:
      a housing configured to connect to an external surface of a tree trunk;
      a light-emitting device disposed at least partially within the housing, the light-emitting device configured to generate and emit light; and
      an optical device operable to evenly distribute the light emitted from the light-emitting device, the optical device disposed proximate the light-emitting device; and
   an optical sensor operable to sense lighting conditions.

* * * * *